United States Patent
Vonshak et al.

(10) Patent No.: US 9,098,183 B2
(45) Date of Patent: Aug. 4, 2015

(54) DRAG AND DROP APPLICATION LAUNCHES OF USER INTERFACE OBJECTS

(71) Applicant: QUALCOMM Incorporated, San Diego, CA (US)

(72) Inventors: Itai Vonshak, Palo Alto, CA (US); Chadwyck Wirtz, Palo Alto, CA (US); Benjamin Rottler, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 13/630,351

(22) Filed: Sep. 28, 2012

(65) Prior Publication Data
US 2014/0096049 A1   Apr. 3, 2014

(51) Int. Cl.
*G06F 3/0486* (2013.01)
*G06F 3/048* (2013.01)
*G06F 9/44* (2006.01)
*G06F 9/445* (2006.01)

(52) U.S. Cl.
CPC .............. *G06F 3/0486* (2013.01); *G06F 3/048* (2013.01); *G06F 9/4443* (2013.01); *G06F 9/445* (2013.01)

(58) Field of Classification Search
CPC ........................................................ G06F 3/048
USPC ........................................................ 715/769
See application file for complete search history.

(56) References Cited

U.S. PATENT DOCUMENTS

| | | | | |
|---|---|---|---|---|
| 6,002,402 A | * | 12/1999 | Schacher ...................... | 715/810 |
| 2010/0214571 A1 | * | 8/2010 | Luo ................ | 358/1.1 |
| 2010/0333008 A1 | * | 12/2010 | Taylor .......................... | 715/769 |
| 2011/0099497 A1 | | 4/2011 | Fok et al. | |
| 2011/0216095 A1 | | 9/2011 | Rydenhag | |
| 2012/0185789 A1 | * | 7/2012 | Louch ............................ | 715/769 |
| 2012/0278746 A1 | * | 11/2012 | Jetha et al. ..................... | 715/770 |

OTHER PUBLICATIONS

"Overview of webOS—User Interface," HP webOS Developer Center, 2011, pp. 1-9, Availabe at: <developer.palm.com/content/resources/develop/overview_of_webos/overview_of_webos_user_interface.html>, Hewlett-Packard Development Company, L.P.

Daniel Howley, "BlackBerry Playbook OS 2.0 Review," Feb. 24, 2012, pp. 1-4, Laptop, Available at: <laptopmag.com/review/software/blackberry-playbook-os-2.0.aspx>.

Steven J. Vaughan-Nichols, "Google's New Chrome OS: Back to the Future," ZD Net, Apr. 10, 2012, pp. 1-2, Available at: <zdnet.com/blog/open-source/googles-new-chrome-os-back-to-the-future/10746>.

TealOS User's Manual, Program Version 1.50, Mar. 29, 2009, pp. 1-41, TealPoint Software, Available at: <tealpoint.com/tealos/files/_osdoc.pdf>.

* cited by examiner

*Primary Examiner* — Andrea Leggett
(74) *Attorney, Agent, or Firm* — Norton Rose Fulbright US LLP

(57) ABSTRACT

Example embodiments relate to drag and drop application launches within a user interface (UI). In example embodiments, a command is received by which a UI object currently displayed in a window of a first application is dragged from the window and dropped onto a home screen of an operating system. A second application suitable for displaying an object type of the UI object is then identified. Finally, the second application is launched in a new window in response to the drop of the UI object on the home screen, such that the new window displays the UI object.

15 Claims, 8 Drawing Sheets

DRAG AND DROP APPLICATION LAUNCHES OF USER INTERFACE OBJECTS

BACKGROUND

A typical user of a computing device relies on a significant number of applications running on the device for both business and personal tasks. For example, a user of a mobile phone, tablet, laptop, or desktop may utilize different applications for writing email, creating documents, browsing the web, listening to music, viewing images, and performing various other functions.

BRIEF DESCRIPTION OF THE DRAWINGS

The following detailed description references the drawings, wherein.

DETAILED DESCRIPTION

Figure 1:
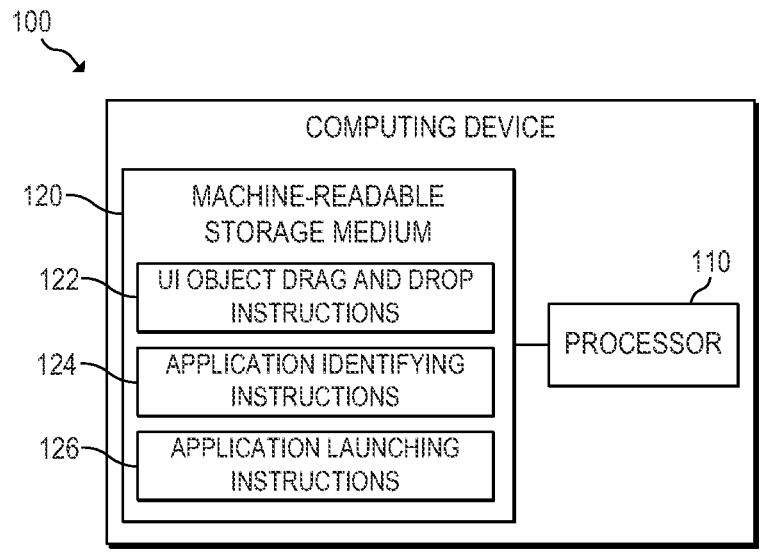
FIG. 1 is a block diagram of an example computing device for enabling a UI object to be opened with an application based on a drag and drop command applied to the UI object.

As detailed above, users of computing devices execute applications to accomplish a variety of different functions. Each of these applications may display a variety of different user interface (UI) objects for providing output to the user and for receiving input. For example, an email application may display email messages, calendar events, contact details, and a number of other types of UI objects. As another example, a web browser may display images, videos, bookmarks, Portable Document Format (PDF) files, and other UI objects.

Although an application may be capable of displaying multiple types of UI objects, a given type of UI object may be best suited for display within a particular application. For example, although an email application may be able to display details of a contact, some devices include a separate contacts application that enables the user to edit details for a person or to initiate communications with that person. As another example, although a web browser may be capable of displaying images, the user may desire to open the image in an image editor, photo album application, or other application.

Existing solutions generally do not enable the user to drag any UI object from any application and automatically open the UI object using an appropriate application. For example, if the user is executing an email application and wishes to edit the details of a contact within a contacts application, he or she may need to first open the contacts application using a separate command and then navigate to the particular contact. Similarly, if the user wishes to edit an image that is currently displayed in a web browser, he or she may need to first save the image to a local device and then open the saved image in the image editing program.

Example embodiments disclosed herein address these issues with existing methods by enabling launches of applications based on drag and drop gestures applied to any UI object in any application. For example, a user may initially drag a UI object currently displayed in a window of a first application and drop the UI object onto a home screen of an operating system. The operating system may then identify a second application that is suitable for displaying an object type of the UI object. Finally, the operating system may launch the second application in a new window in response to the drop of the UI object on the home screen, such that the new window displays the UI object.

In some implementations, when a user drags the UI object from the first application, the first application may create a data object that stores data related to the UI object. For example, when the application is an email application and the selected object is an email, the application may create a data object that embeds information including the recipient list, email subject, and email text. The first application may then provide the data object to the second application via the operating system, such that the second application may display the UI object using the information in the data object.

In this manner, example embodiments enable a user to quickly launch an appropriate application for any UI object by simply dragging the UI object from an application and dropping the UI object onto a home screen of the operating system. This enables a user to utilize a simple gesture to open any UI object in a new window using an appropriate application. These example embodiments are particularly useful when a given application can display multiple types of UI objects, but when another application is better suited for displaying, editing, and performing other actions on the UI object.

Referring now to the drawings, FIG. 1 is a block diagram of an example computing device 100 for enabling a UI object to be opened with an application based on a drag and drop command applied to the UI object. Computing device 100 may be, for example, a notebook computer, a desktop computer, an all-in-one system, a tablet computing device, an electronic book reader, a mobile phone, a set-top box, or any other computing device 100 suitable for displaying a user interface and receiving user input via the user interface. In the embodiment of FIG. 1, computing device 100 includes a processor 110 and a machine-readable storage medium 120.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 122, 124, 126 to enable a user to launch an appropriate application for a given UI object based on a drag and drop command. As an alternative or in addition to retrieving and executing instructions, processor 110 may include one or more electronic circuits that comprise electronic components for performing the functionality of one or more of instructions 122, 124, 126.

Machine-readable storage medium 120 may be any electronic, magnetic, optical, or other non-transitory physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. As described in detail below, machine-readable storage medium 120 may be encoded with a series of executable instructions 122, 124, 126 for enabling application launches triggered by drag and drop commands.

UI object drag and drop instructions 122 may initially receive a command by which a UI object currently displayed in a window of a first application is dragged from the window and dropped onto a home screen of an operating system (OS). For example, computing device 100 may be executing a particular application and the user may move a UI object from the application to the home screen by providing input via a touch display, mouse, trackpad, or other input mechanism.

Each of the applications in computing device 100 may comprise instructions executable by processor 110 to enable a user to perform a set of specific tasks. The applications may reside within the OS of computing device 100 and call functions provided by the OS to enable the user to perform these tasks. For example, each application may enable the user to communicate with other users, generate or view documents or other files, and/or access data via the Internet or another network. Thus, non-limiting examples of applications for execution in computing device 100 include an email application, calendar application, messaging application, phone or videoconferencing application, web browser, word processor, contacts application, music or video player, online application catalog, and the like.

In order to enable the user to provide input and receive output via computing device 100, each application may display a number of UI objects with which the user may interact. Each UI object may include a set of visual components outputted on an available display to provide information to a user. For example, the visual components for a given UI object may include visible text, images, UI widgets (e.g., text boxes, scroll bars, selection menus, etc.), or a combination thereof. Accordingly, UI objects are not limited to discrete files stored in a file system of computing device 100; rather, the UI objects may be any visible components that make up a portion of the visual display of an application.

As one set of examples, the UI objects may be discrete visual portions of a given application that may be dislodged from the application and dragged to the home screen by the user. For example, when the application is a contacts application, email application, or address book, the UI objects may include individual contact objects that display information describing a particular person. As another example, when the application is a web browser, the UI objects may include images, videos, icons, bookmarks, uniform resource locators, and widgets. Other suitable examples of UI objects will be apparent depending on the particular type of application.

The user may initialize the command for dragging the UI object from the application using a number of different types of input. As one example, the user may simply select the UI object with a touch of a touch-enabled display, a mouse click, or other selection input, and then drag the UI object outside of the window of the application. As another example, the user may first dislodge the UI object from the application and then drag the object within the user interface. To dislodge the UI object, the user may, for example, select the UI object with a selection input and hold the input for a predetermined duration of time (e.g., 1 second). As another example, the user may dislodge the UI object by performing a peeling gesture in which a corner of the UI object is selected and dragged in a direction toward the center of the UI object. After the UI object has been dislodged from the application, the user may then drag the object outside of the application window and release the UI object on the home screen of the operating system to trigger the application launch.

The home screen may be a base user interface of the operating system. For example, the home screen may be an area within the UI that is displayed when the UI of the operating system first loads and that remains displayed as the bottom-most layer within the UI. As one specific example, in a mobile operating system, the home screen may be an area within the user interface that maintains icons that may be selected to launch particular applications. Alternatively, the home screen may be an area that, although not used to display icons for applications, serves as the background for applications launched in windows within the operating system. As another example, in a personal computer operating system, the home screen may be a "desktop" of the operating system, which may maintain links to applications, files, and folders.

As previously mentioned, the user may trigger the launch of an appropriate application by dragging a particular UI object from an application and dropping the UI object onto the OS home screen by releasing the held input while the object is overlaid on the home screen. Note, however, that the term "drop" is not limited to implementations in which the user releases the input. Rather, in some implementations, the drop may be automatically triggered in response to the user dragging a UI object onto an area of the interface that corresponds to the OS home screen.

In response to a drag and drop of a UI object, computing device 100 may then begin the process for launching an appropriate application. Application identifying instructions 124 may initially identify a second application that is suitable for displaying an object type of the UI object. For example, identifying instructions 124 may first determine an object type of the UI object. In some implementations, the UI object may be associated with metadata that describes the object, which may include a specification of the type of the object. For example, the metadata may be stored in a data structure associated with the UI object and may specify whether the UI object is an image, video, email, contact, note, etc. As a specific example, the metadata may be an Extensible Markup Language (XML) data structure that includes a field entitled "type." Object type determining instructions 124 may determine the type of the UI object by simply extracting the object type from the metadata field.

After determining the object type, application identifying instructions 124 may then determine an application suitable for displaying the UI object. For example, identifying instructions 124 may access a registry or other data structure within the operating system that maintains an association between UI object types and corresponding applications. In such scenarios, individual applications may register each type of supported UI object with the operating system, such that the registry stores an updated listing of available applications that can open each UI object type. Note that, as mentioned above, the UI object types are not limited to discrete files stored in a file system of the OS. As a result, the registry may identify the appropriate application for any type of discrete UI object, rather than being limited to file type associations.

Note that, in some scenarios, multiple applications may be suitable for displaying a given object type. In such scenarios, identifying instructions 124 may identify the application suitable for displaying the UI object by, for example, determining which application is assigned as the default application for the given UI object type. As another example, identifying instructions 124 may identify an application most suitable for displaying the UI object based on the capabilities of the application with respect to the UI object. For example, identifying instructions 124 may give preference to applications that also enable editing of the UI object, rather than simply displaying the UI object. As yet another example, identifying instructions 124 may select the application that the user has utilized to most frequently open the UI object type. To enable such implementations, individual applications may report viewing frequency data to the operating system for each supported object type.

After identification of the application that will open the UI object, application launching instructions 126 may then launch the identified application in a new window, such that the new window of the application displays the UI object. For example, the operating system may determine a location of the executable code for the identified application on computing device 100 and trigger execution of the code within a new window. The operating system may also provide the UI object to the application to permit the display of the UI object within the new window.

In some implementations, launching instructions 126 may limit the loaded code to a subset of the executable instructions of the application that is sufficient to enable displaying and/or editing of the UI object. For example, some applications may be implemented in a scripting language, such as JavaScript, and may therefore include a number of separate script functions that may be executed independently. In such implementations, the operating system may limit the executed script functions to those that are used to display and/or edit the object. To enable such implementations, the registry or data structure in the operating system may also identify the particular code functions used by each application to display and/or edit each supported UI object type, such that the operating system may identify these functions when loading the application.

Having described the implementation of computing device 100, a specific example of the operation of computing device 100 will now be presented. Suppose that the user has dragged a UI object that corresponds to a contact from an email application and dropped the UI object onto a home screen of the operating system. In response, computing device 100 may determine that the UI object is a contact object by, for example, extracting a "type" metadata field from metadata associated with the UI object. Finally, computing device 100 may determine that a contacts application is suitable for displaying the contact UI object and therefore trigger the launch of the contacts application in a new window. The new window may display the contact UI object dragged from the email application, such that the user may view and/or edit details for that particular person from within the new window.

Figure 2:
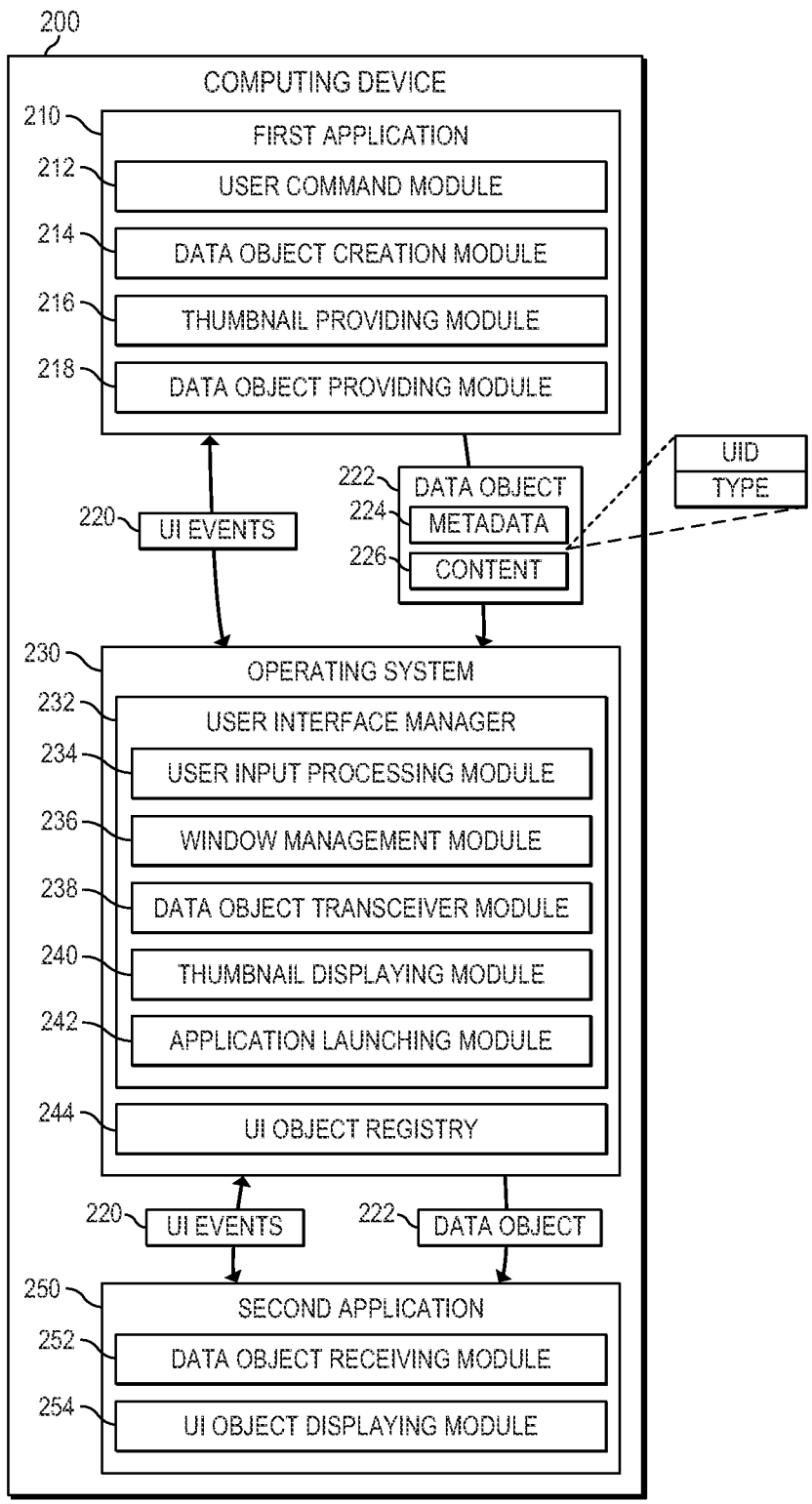
FIG. 2 is a block diagram of an example computing device for enabling a UI object to be opened with an application based on provision of a data object describing the UI object from a first application to a second application via an operating system.

FIG. 2 is a block diagram of an example computing device 200 for enabling a UI object to be opened with an application based on provision of a data object 222 describing the UI object from a first application 210 to a second application 250 via an operating system 230. As with computing device 100 of FIG. 1, computing device 200 may be any computing device suitable for displaying a user interface and receiving user input via the user interface.

As illustrated in FIG. 2 and described in detail below, computing device 200 may include a number of modules 210-254. Each of the modules may include a series of instructions encoded on a machine-readable storage medium and executable by a processor of computing device 200. In addition or as an alternative, each module may include one or more hardware devices including electronic circuitry for implementing the functionality described below.

First application 210 may be any set of instructions executable by a processor of computing device 200 to enable a user to perform a set of tasks. Thus, first application 210 may output a user interface including a number of UI objects with which the user may interact to perform the set of tasks. In the implementation of FIG. 2, first application 210 may include user command module 212, data object creation module 214, thumbnail providing module 216, and data object providing module 218.

User command module 212 may initially receive a user command by which a UI object of a given object type is dragged from the first application and dropped onto a home screen of operating system 230. For example, user command module 212 may receive a notification of a UI event 220 from UI manager 232 of operating system 230, where the UI event 220 specifies details regarding an input provided by the user (e.g., a touch input, mouse click, etc.). User command module 212 may then determine whether the UI event 220 specifies a user command to initiate a drag of a particular UI object. For example, user command module 212 may determine whether the user has selected and held a particular UI object for a predetermined duration of time, thereby indicating a desire to begin the process for transferring the UI object outside of application 210. As another example, user command module 212 may determine whether the user has performed a peeling gesture on a particular UI object by dragging the corner of the UI object toward the center of the UI object. Further details regarding the process for detecting user commands are provided above in connection with UI object drag and drop instructions 122 of FIG. 1.

Upon detection of a user command to drag a particular UI object by user command module 212, data object creation module 214 may then create a data object 222 that maintains data related to the UI object. As detailed below, this object 222 enables the details regarding the UI object to be transferred between first application 210 and second application 250 via OS 230. Module 214 may, for example, include a set of metadata 224 that includes a unique identifier for the UI object and a type of the UI object. Module 214 may also include content 226 that is sufficient to enable second application 250 to display the UI object when second application 250 receives data object 222.

The metadata 224 included in the data object may be any set of data that describes the particular UI object. For example, the metadata may be a data structure of a predefined format that includes a number of fields, such as an XML data structure. These fields may include a unique identifier (UID) that includes a plurality of alphabetic, numeric, and/or symbolic characters that uniquely identify the particular data object throughout the entire OS 230 of device 200. The metadata fields may additionally include a data type that specifies the type of UI object (e.g., email, image, video, contact, text message, note, etc.), such that operating system 230 can identify the type of object when launching second application 250.

Content 226 may include the actual content of the object, such as displayable text, images, UI widgets, or a combination thereof. In some implementations, content 226 may include information sufficient to display the UI object within second application 250, such that second application 250 can fully display the object using data object 222 without accessing another file on computing device 100.

To give a specific example of a data object 222, when application 210 is a browser application and the UI object is a particular image, metadata 224 may include a UID for the particular image and a data type of "image," while content 226 may include a set of data encoding the image. As another example of a data object, when application 210 is an email application and the UI object is a particular contact, metadata 224 may include a UID for the particular contact and a data type of "contact," while content 226 may include contact details for the person, a picture of the person, etc.

In addition to creation of a data object 222 for the UI object by module 214, thumbnail providing module 216 may also create a thumbnail image to represent the UI object. For example, module 216 may generate an image that contains a reduced size preview of the UI object. The image may be, for example, a Joint Photographic Experts Group (JPEG) image, a Graphics Interchange Format (GIF) image, a Portable Network Graphics (PNG) image, or an image encoded according to any other format. Alternatively, the thumbnail image may include a number of UI components at a reduced size (e.g., reduced size text, images, and UI widgets). After generating the thumbnail image of the UI object, thumbnail providing module 216 may then provide the thumbnail to user interface manager 232 of operating system 230 for display by thumbnail displaying module 240.

After creation of the data object 222 by data object creation module 214, data object providing module 218 may then provide the data object 222 to second application 250 via operating system 230. For example, data object providing module 218 may provide the data object 222, including metadata 224 and content 226, to second application 250 via user interface manager 232 of operating system 230.

Operating system 230 may be any set of instructions executable by a processor of computing device 200 to manage the hardware resources of computing device 200 and provide an interface to the hardware to applications running in OS 230, such as applications 210, 250. In the implementation of FIG. 2, operating system 230 may include user interface manager 232 and UI object registry 244.

User interface manager 232 may be a component of operating system 230 that controls the user interfaces presented by applications in operating system 230, such as first application 210 and second application 250. For example, user interface manager 232 may provide a set of user interface features accessible by applications 210, 250 using API function calls. User interface manager 232 may also provide an application runtime environment, such that user interface manager 232 loads applications 210, 250 and manages their scheduling and execution. In the implementation of FIG. 2, user interface manager 232 includes user input processing module 234, window management module 236, data object transceiver module 238, thumbnail displaying module 240, and application launching module 242.

User input processing module 234 may receive notifications of user input events from operating system 230 and, in response, provide UI event notifications 220 to applications in operating system 230, such as first application 210 and second application 250. For example, user input processing module 234 may provide notifications of UI events 220 that describe a type of input (e.g., touch or mouse input), the location of the input (e.g., coordinates on a display of device 200), and any other descriptors of the input (e.g., a duration of a hold of the input). As detailed above, user command module 212 of first application 210 may then process the event notifications 220 to determine whether the user has provided a command to drag a UI object from first application 210. Alternatively, user input processing module 234 may process the input from the user with reference to the displayed UI objects and directly notify first application 210 when the user has provided a command to drag a UI object from first application 210.

Window management module 236 may control the display of application windows within the user interface of operating system 230. For example, each application 210, 250 may include one or more windows. Window management module 236 may enable the user to control the appearance of each window by, for example, changing between a full screen mode and a windowed mode.

Figure 5A:
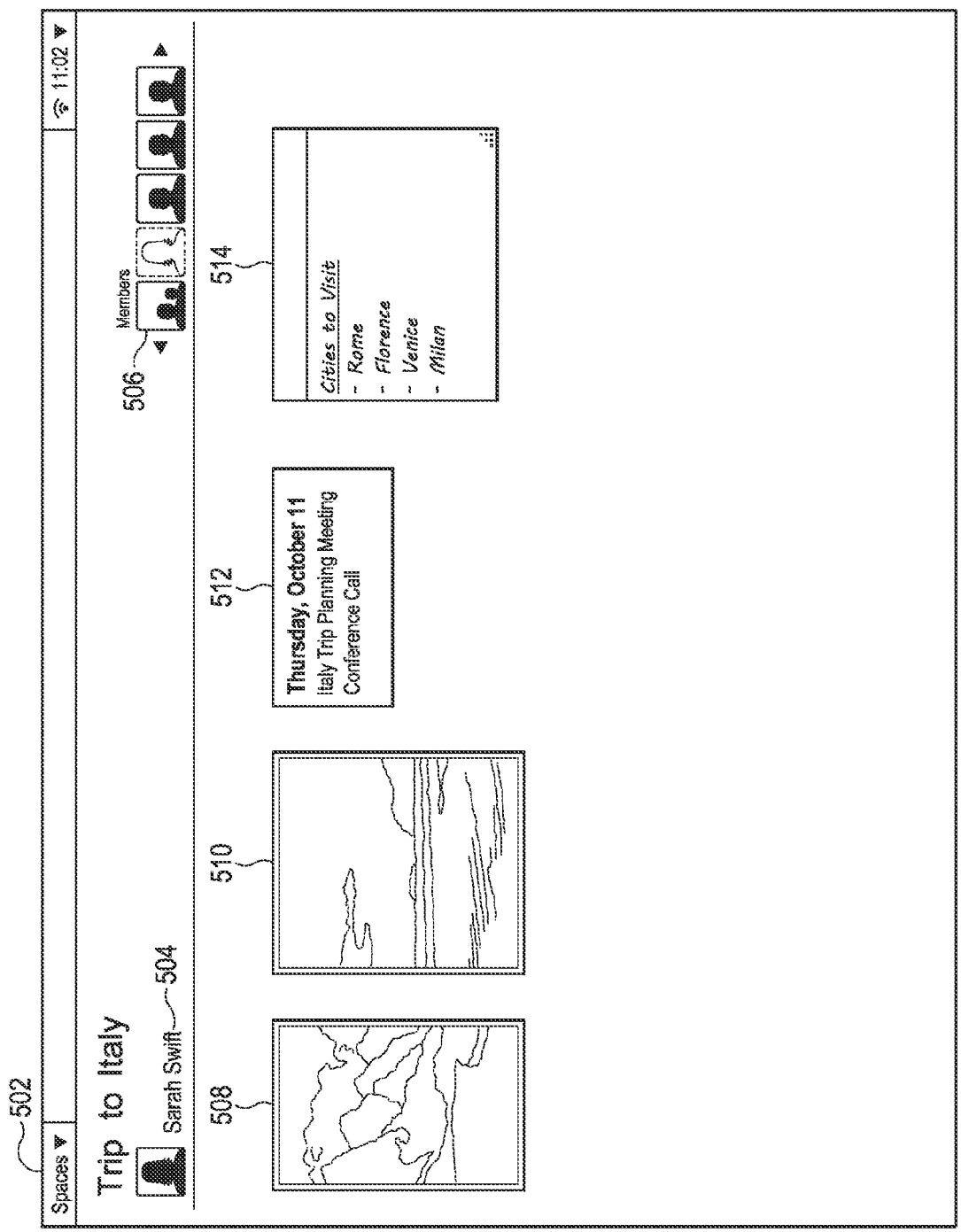
FIG. 5A is a diagram of an example user interface of a data sharing application including UI objects of a number of different types.
Figure 5B:
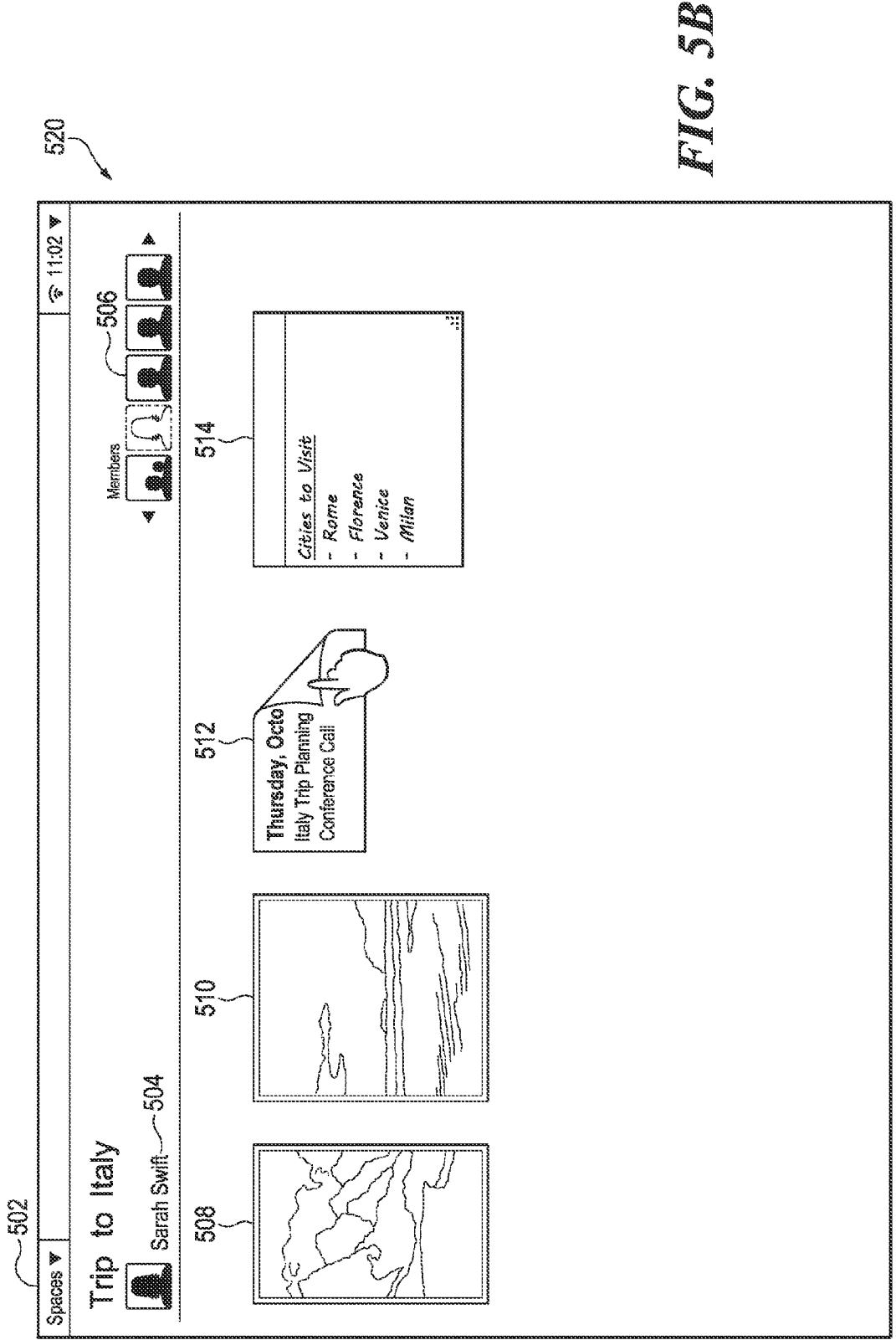
FIG. 5B is a diagram of an example user interface of a data sharing application in which a user has applied a peeling gesture to a calendar event UI object.
Figure 5C:
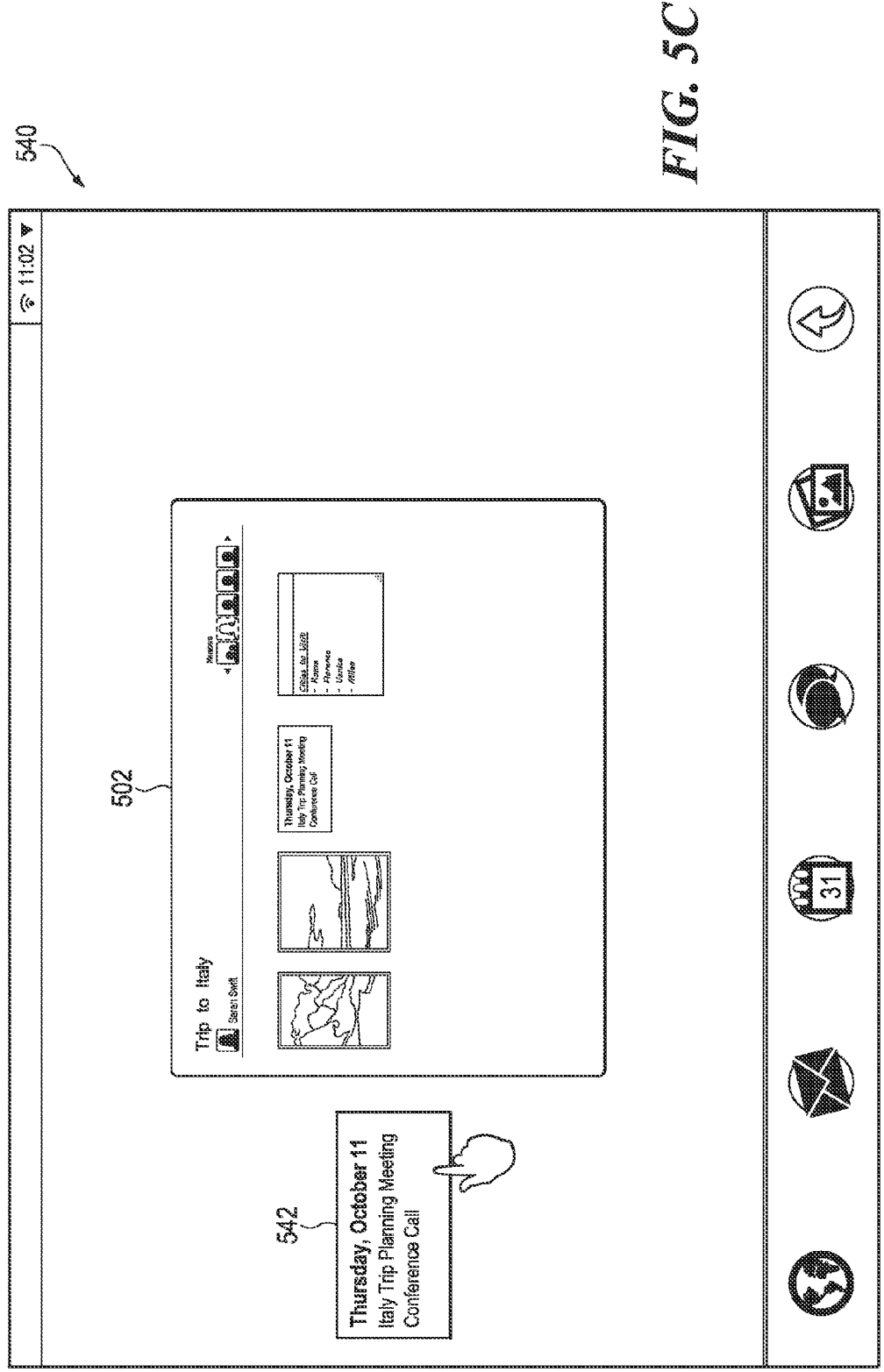
FIG. 5C is a diagram of an example user interface in which the calendar event UI object has been dislodged from the data sharing application in response to the peeling gesture and in which the operating system has modified the view to a windowed mode.
Figure 5D:
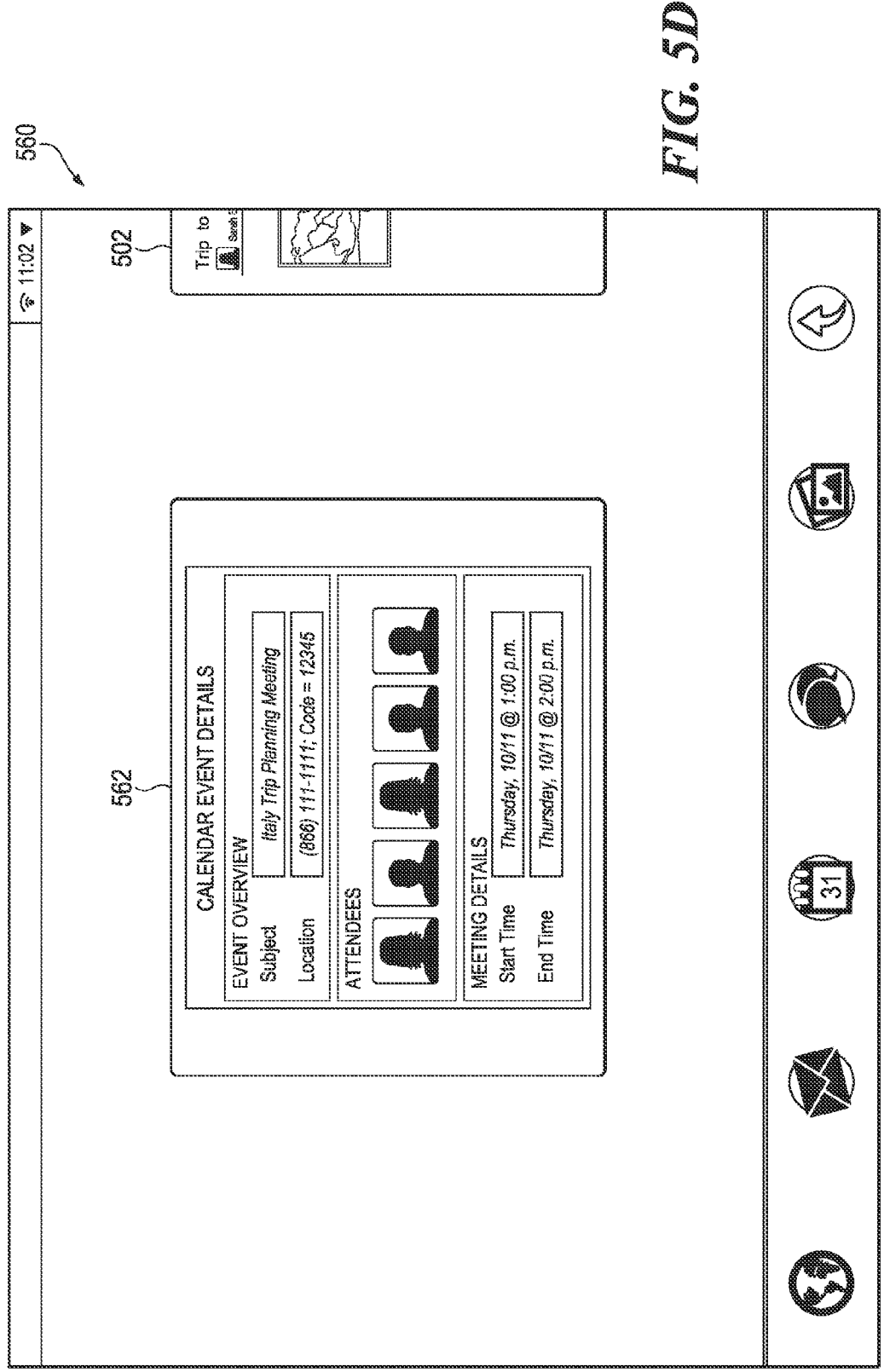
FIG. 5D is a diagram of an example user interface in which the calendar event UI object has been opened with a calendar application in a new window in response to a release of the calendar event UI object on the operating system home screen.
Figure 5E:
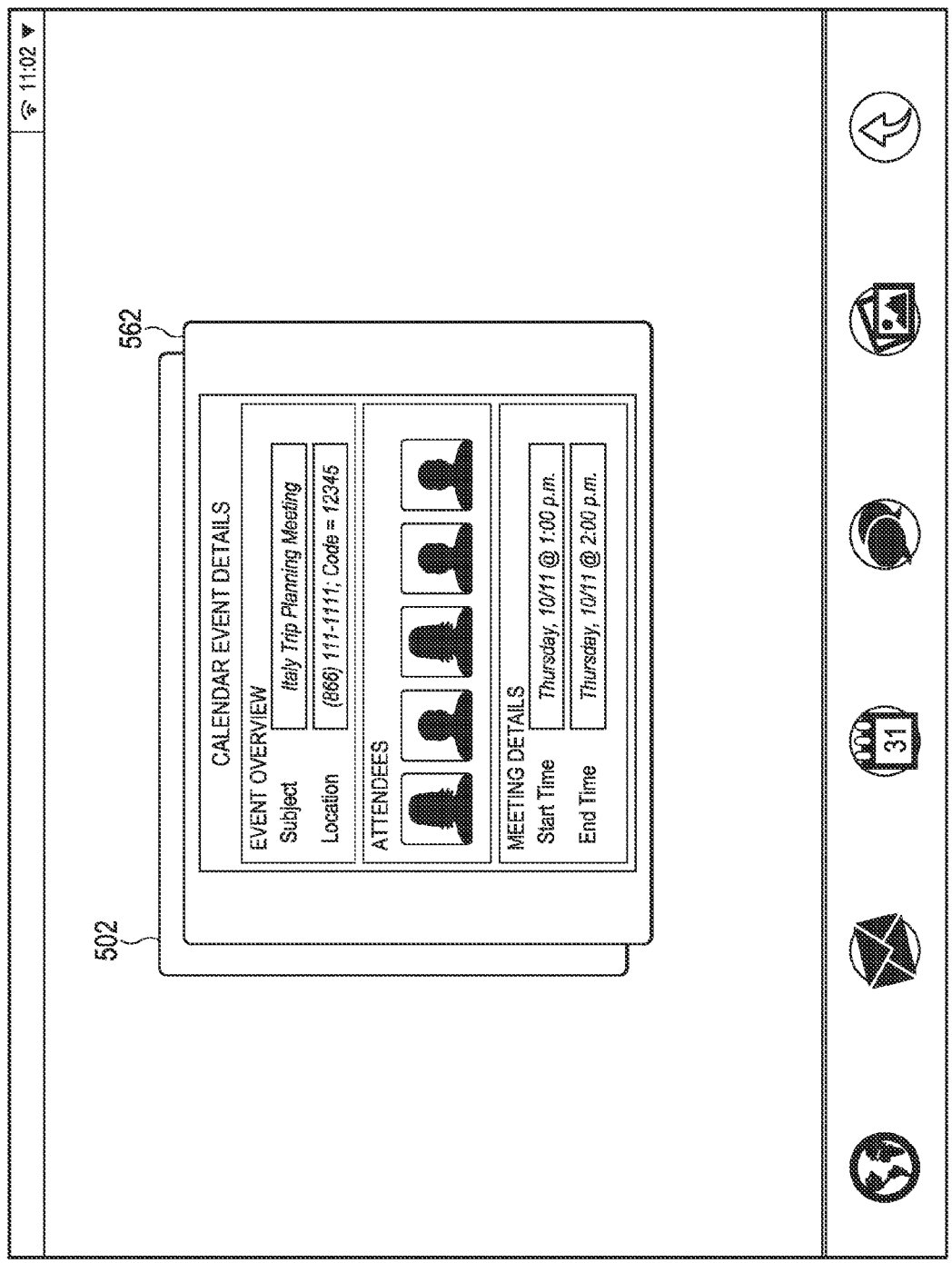
FIG. 5E is a diagram of an example user interface in which the calendar event UI object has been opened with a calendar application in a stacked window in response to a release of the calendar event UI object on the window of the data sharing application.

In the full screen mode, a single window for a given application may occupy the entire screen excluding any toolbars and status information. FIGS. 5A & 5B, described in further detail below, illustrate an application in the full screen mode mode. In contrast, in the windowed mode, each application may be displayed in a reduced-size window, such that the home screen of OS 230 and one or more application windows are visible. In some implementations of the windowed mode, each application window may be displayed along a single axis (e.g., a horizontal or vertical axis). FIGS. 5C-5E, also described in further detail below, illustrate one or more applications executing in the windowed mode. During normal execution, the user may switch from the full screen mode to the windowed mode by, for example, activating a hardware button or UI element. Similarly, the user may switch from the windowed mode to the full screen mode for a given window by, for example, tapping the window with a touch input or otherwise selecting the window.

In some implementations, window management module 236 may trigger a switch from the full screen mode to the windowed mode in response to the user's command to drag a UI object from a given application, such as first application 210. For example, when the user dislodges a UI object from the interface of a displayed window, window management module 236 may switch to the windowed mode. As the user drags the object around the interface, thumbnail displaying module 240 may continue to output the thumbnail image of the UI object.

When the user drops the UI object onto the home screen, window management module 236 may trigger the display of a new window in the reduced-size mode or the full screen mode. Application launching module 242, detailed below, may then trigger execution of the application within the newly-displayed window. In some implementations, if the user drops the UI object onto an existing application window, window management module 236 may instead create a new window that is stacked on top of the existing window. FIG. 5E, described in further detail below, illustrates two windows in a stacked configuration.

Data object transceiver module 238 may manage the process for receiving and transmitting data objects 222 between applications 210, 250. After first application 210 has created an object 222, data object transceiver module 238 may receive the data object 222 from first application 210. Then, after application launching module 242 launches second application 250, data object transceiver module 238 may pass the data object 222 to the second application 250. In this manner, data object transceiver module 238 may serve as an operating system intermediary between first application 210 and any other applications that desire to receive the data object, such as second application 250.

In addition to managing the process for transferring the data object 222 between applications, UI manager 232 may also manage the visualization of the object while the user is dragging the UI object. For example, thumbnail displaying module 240 may initially receive the thumbnail image of the UI object from thumbnail providing module 216 of first application 210. Thumbnail displaying module 240 may then display the thumbnail image of the UI object while the UI object is dragged within the user interface.

In response to user input processing module 234 detecting a drop of a UI object on the home screen, application launching module 242 may initially determine an application suitable for displaying the UI object. For example, application launching module 242 may initially extract the type field from metadata 224. Module 242 may then access UI object registry 244 to identify an application suitable for displaying the UI object type. For example, UI object registry 244 may maintain an association between each UI object type and one or more applications suitable for opening the corresponding UI object type.

After identifying an application suitable for loading the UI object type and after window management module 236 spawns a new window, application launching module 242 may then begin execution of the identified application within the window. For example, application launching module 242 may retrieve the code for second application 250 and initiate execution of the code. In some implementations, application launching module 242 may limit the loaded portions of the code of second application 250 to those used to display and/or enable editing of the UI object within the new window, such as a predefined set of script functions.

As with first application 210, second application 250 may be any set of instructions executable by a processor of computing device 200 to enable a user to perform a set of specific tasks. In the implementation of FIG. 2, second application 250 may include data object receiving module 252 and UI object displaying module 254.

Data object receiving module 252 may initially receive a data object 222 from first application 210 via UI manager 232 of operating system 230, including metadata 224 and content 226. In response to receipt of data object 222 from operating system 230, UI object displaying module 254 may then output the corresponding UI object within the newly-launched window of second application 250. For example, UI object displaying module 254 may read content 226 from the data object 222 and output the content within the window of second application 250.

Figure 3:
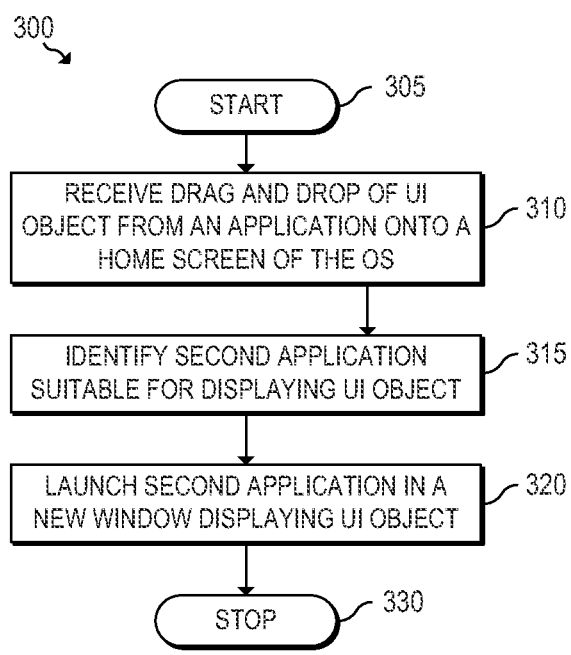
FIG. 3 is a flowchart of an example method for enabling a UI object to be opened with an application based on a drag and drop command applied to the UI object.

FIG. 3 is a flowchart of an example method 300 for enabling a UI object to be opened with an application based on a drag and drop command applied to the UI object. Although execution of method 300 is described below with reference to computing device 100 of FIG. 1, other suitable devices for execution of method 300 will be apparent to those of skill in the art (e.g., computing device 200). Method 300 may be implemented in the form of executable instructions stored on a machine-readable storage medium, such as storage medium 120, and/or in the form of electronic circuitry.

Method 300 may start in block 305 and proceed to block 310, where computing device 100 may receive a command to drag a UI object from an application. For example, the user may dislodge a particular UI object from the application's window and begin dragging it with a held touch, mouse click, or other input. Computing device 300 may then receive a subsequent command to release the UI object on the home screen of the operating system.

In response, in block 315, computing device 100 may identify a suitable application for displaying the particular UI object. For example, computing device 100 may extract the object type from a metadata field associated with the UI object and determine an appropriate application by accessing a registry of UI object associations. In block 320, computing device 100 may then launch the identified application in a new window, such that the new window displays the UI object. Finally, method 300 may stop in block 330.

Figure 4:
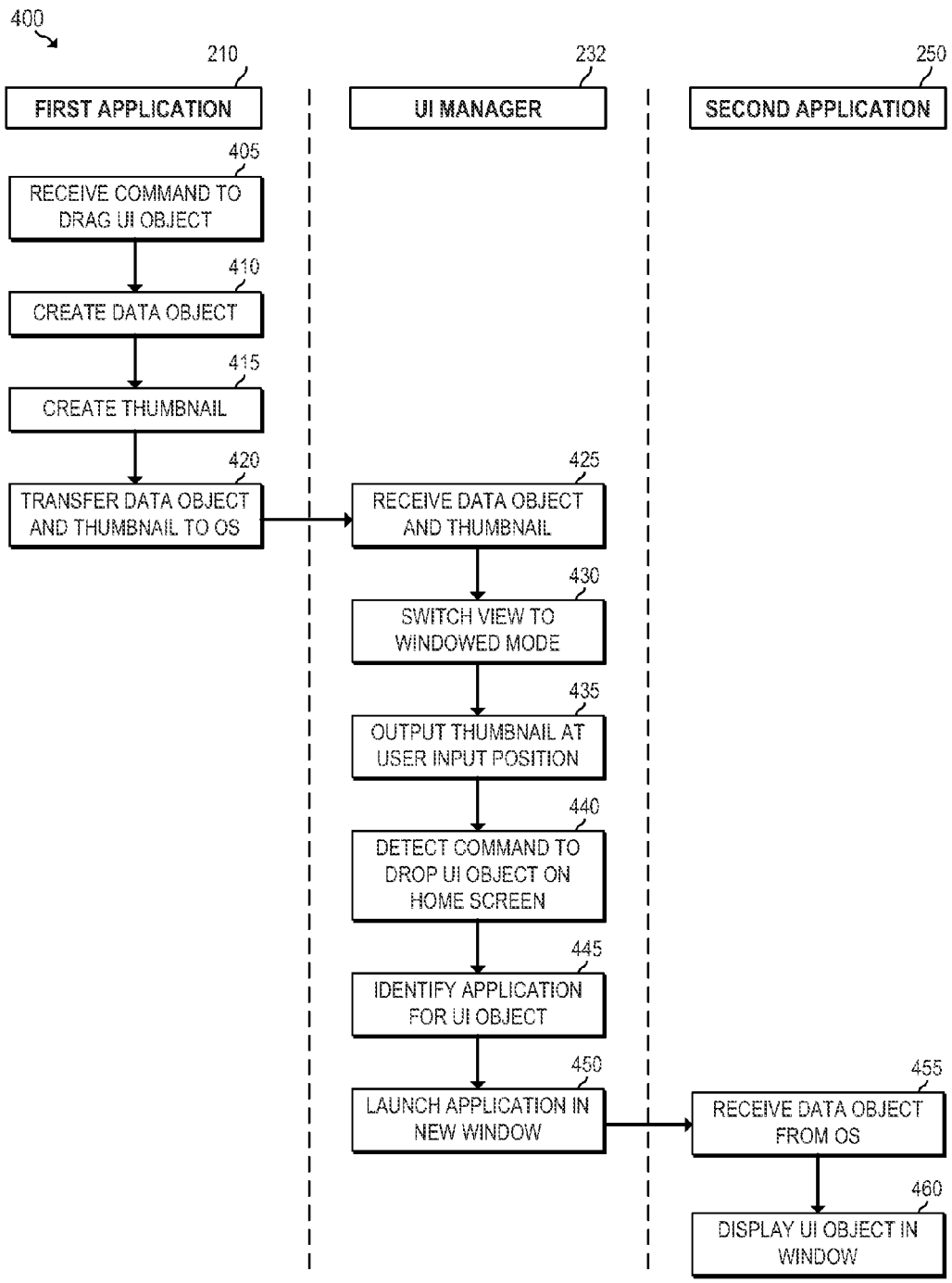
FIG. 4 is a flowchart of an example method for enabling a UI object to be opened with an application based on provision of a data object describing the UI object from a first application to a second application via an operating system.

FIG. 4 is a flowchart of an example method 400 for enabling a UI object to be opened with an application based on provision of a data object describing the UI object from a first application 210 to a second application 250 via an operating system. Although execution of method 400 is described below with reference to components 210, 232, 250 of computing device 200 of FIG. 2, other suitable components for execution of method 400 will be apparent to those of skill in the art. Method 400 may be implemented in the form of executable instructions stored on a machine-readable storage medium and/or in the form of electronic circuitry.

As illustrated, method 400 may include a number of blocks 405, 410, 415, 420 executed by first application 210, a number of blocks 425, 430, 435, 440, 445, 450 executed by UI manager 232, and a number of blocks 455, 460 executed by second application 250. Note that, in some implementations, execution of the blocks of method 400 may be distributed differently between first application 210, UI manager 232, and second application 250.

Method 400 may start in block 405, where first application 210 may receive a command to drag a UI object from its window. For example, first application 210 may receive a touch input or mouse input that indicates a desire to drag a particular UI object from the application. This input may be, for example, a held selection of the particular UI object for a given period of time or a peeling gesture performed on the UI object.

Next, in block 410, first application 210 may create a data object that stores data related to the UI object. For example, first application 210 may create a data structure that stores metadata describing the UI object and content of the UI object. In block 415, first application 210 may then create a thumbnail image that stores a preview of the content of the UI object to be transferred to the second application. After creating the UI object and thumbnail, first application 210 may then, in block 420, transmit the data object and thumbnail to UI manager 232.

Execution of method 400 may then transfer to UI manager 232 when, in block 425, UI manager 232 may receive the data object and thumbnail generated by application 210. Next, in block 430, UI manager 232 may modify the display from a full screen mode in which the display is limited to a single window to a windowed mode in which at least a portion of the home screen of the operating system is visible. In block 435, UI manager 232 may then output the thumbnail image of the UI object at the position of the user's input. For example, as the user drags the UI object around the visible display area of computing device 200, UI manager 232 may track the position of the user's input with the thumbnail.

In block 440, UI manager 232 may then detect a drop of the UI object on the home screen of the operating system. Next, in block 445, UI manager 232 may identify a suitable application for opening the UI object by, for example, querying a local registry with the type of the object. In block 450, UI manager 232 may then create a new window, begin execution of second application 250 within the new window, and transfer the data object generated for the UI object to second application 250.

Execution of method 400 may then transfer to second application 250 when, in block 455, second application 250 may receive the transferred data object from UI manager 232. In response, second application 250 may access the content within the data object to display the UI object within the window. For example, second application 250 may begin executing portions of code that are used to display the UI object and/or enable editing of the UI object within second application 250. Method 400 may then stop execution.

FIG. 5A is a diagram of an example user interface 500 of a data sharing application 502 including UI objects of a number of different types. As illustrated, user interface 500 includes an application interface displayed by a data sharing application 502 that enables a group of users 504, 506 to share UI objects of a plurality of different types from a plurality of applications. In particular, each of the UI objects 508, 510, 512, 514 is included in a shared space, which may be a particular instance of the data sharing application.

In the illustrated interface of data sharing application 502, contact UI object 504 corresponds to the owner of the shared space, Sarah Swift, and includes a picture of Sarah. The contact UI object 504 may be associated with contact data for Sarah, such as her email address, telephone number, etc. Member UI objects 506 may also be contact UI objects corresponding to people who have been granted access to the shared space by Sarah.

Data sharing application 502 may also include two image UI objects 508, 510, which may encode data according to a known image encoding technique. Calendar event 512 may be a calendar event UI object and may store information relating to a meeting, such as a date and time, subject of the meeting, attendee lists, and other information. Finally, memo 514 may be a memo UI object that is associated with textual data for the memo. Each of the UI objects, including contacts 504, 506, images 508, 510, calendar event 512, and memo 514, may be dragged from the interface of application 502 in accordance with the implementations described above.

FIG. 5B is a diagram of an example user interface of a data sharing application 502 in which a user has applied a peeling gesture to a calendar event UI object 512. As illustrated, the user has initiated the peeling gesture on UI object 512 by selecting a corner of the object and dragging the corner in the direction of the center the object. The selection may be performed using, for example, a touch input or a mouse click. As the user moves the gesture toward the center of the object, calendar event UI object 512 may display an animation that provides visual feedback similar to turning a sheet of paper.

FIG. 5C is a diagram of an example user interface 540 in which the calendar event UI object 542 has been dislodged from the data sharing application 502 in response to the peeling gesture and in which the operating system has modified the view to a windowed mode. In particular, in response to the peeling gesture of FIG. 5B reaching a particular threshold, UI object 542 has been dislodged from data sharing application 502, such that the user may drag the UI object 542 around the user interface. Additionally, to permit the user to view the home screen of the operating system, the operating system has modified the view of application 502 from the full screen mode to the windowed mode.

FIG. 5D is a diagram of an example user interface 560 in which the calendar event UI object 542 has been opened with a calendar application 562 in a new window in response to a release of the calendar event UI object 542 on the operating system home screen. More specifically, the user has released UI object 542 on the blank space of the operating system home screen depicted in FIG. 5C.

As a result, the operating system has received a data object describing the UI object 542, spawned a new window 562, and started execution of a calendar application within window 562. As illustrated, the calendar application 562 has limited its display to the calendar event corresponding to UI object 542. For example, as also detailed above, calendar application 562 may limit the loaded code to those portions of code (e.g., script functions) that are used to enabling displaying and/or editing of a particular calendar event.

FIG. 5E is a diagram of an example user interface 580 in which the calendar event UI object 542 has been opened with a calendar application 562 in a stacked window in response to a release of the calendar event UI object 542 on the window of the data sharing application 502. More specifically, assuming the user has released the UI object on the window of the data sharing application 502, rather than the operating system home screen, the operating system may stack the new window 562 on top of the window of the data sharing application. The process for displaying the calendar event UI object 542 within the new window 562 may be similar to the process described above in connection with FIG. 5D.

The foregoing disclosure describes a number of example embodiments for enabling a user to quickly launch an appropriate application for any UI object using a simple gesture. For example, as detailed above, a user may dislodge a UI object from a source application and drop the UI object onto an operating system home screen, thereby triggering an automatic launch of the UI object by an application suitable for displaying the object. Additional embodiments and advantages of such embodiments will be apparent to those of skill in the art upon reading and understanding the foregoing description.

We claim:

1. A computing device for enabling drag and drop application launches within a user interface (UI), the computing device comprising:
   a processor to:
   receive a command by which a UI object currently displayed in a window of a first application is dragged from the window and automatically dropped onto a home screen of an operating system in response to the UI object being dragged from the window;
   identify a second application that is suitable for displaying an object type of the UI object, wherein the second application is identified to enable editing and displaying the UI object by determining which application is assigned as a default application for a given UI object type; and
   launch the second application in a new window in response to a drop of the UI object on the home screen, the new window displaying the UI object from the first application.

2. The computing device of claim 1, wherein the processor is further to:
   create a data object that stores data related to the UI object in response to the command to drag the UI object from the first application, wherein data in the data object includes the object type of the UI object; and
   provide the data object from the first application to the second application via the operating system.

3. The computing device of claim 2, wherein the data in the data object further comprises content of the UI object that is sufficient to enable the second application to display the UI object.

4. The computing device of claim 1, wherein:
the received command comprises a peeling gesture in which a corner of the UI object is selected and dragged in a direction toward a center of the UI object; and
the UI object is dislodged from the window of the first application and able to be dragged in response to the peeling gesture.

5. The computing device of claim 1, wherein the processor is further to:
display a thumbnail image of the UI object while the UI object is dragged from the first application to the home screen of the operating system.

6. The computing device of claim 1, wherein, to identify the second application, the processor is further to:
access a UI object registry maintained by the operating system, the UI object registry storing an association between each UI object type and a corresponding application for displaying the UI object type.

7. The computing device of claim 1, wherein, to launch the second application, the processor is further to:
load a subset of executable instructions of the second application that is sufficient to handle the display of the UI object in the new window.

8. The computing device of claim 1, wherein the processor is further to:
modify the first application from a full screen mode to a windowed mode in response to the command to drag the UI object, wherein, in the windowed mode, a portion of the home screen is visible and each application is displayed in a reduced-size window along an axis; and
launch the second application in the new window in the windowed mode along the axis in response to the drop of the UI object on the visible portion of the home screen.

9. The computing device of claim 8, wherein the processor is further to:
launch the second application in the new window in the windowed mode within a stack of windows in response to the drop of the UI object on an existing reduced-size window, the stack of windows including the new window and the existing window.

10. A non-transitory machine-readable storage medium encoded with instructions executable by a processor of a computing device for enabling drag and drop application launches within a user interface (UI), the machine-readable storage medium comprising:
instructions for receiving a command by which a UI object currently displayed in a window of a first application is dragged from the window and automatically dropped onto a home screen of an operating system in response to the UI object being dragged from the window;
instructions for providing, from the first application to the operating system, a data object comprising an object type of the UI object;
instructions for identifying, by the operating system, a second application that is suitable for displaying the object type of the UI object, wherein the second application is identified to enable editing and displaying the UI object by determining which application is assigned as a default application for a given UI object type; and
instructions for launching, by the operating system, the second application in a new window in response to a drop of the UI object on the home screen, the new window displaying the UI object from the first application.

11. The non-transitory machine-readable storage medium of claim 10, wherein:
the received command comprises a peeling gesture in which a corner of the UI object is selected and dragged in a direction toward a center of the UI object; and
the UI object is dislodged from the window of the first application and able to be dragged in response to the peeling gesture.

12. The non-transitory machine-readable storage medium of claim 10, further comprising:
instructions for modifying the first application from a full screen mode to a windowed mode in response to the command to drag the UI object, wherein, in the windowed mode, a portion of the home screen is visible and each application is displayed in a reduced-size window along an axis; and
instructions for launching the second application in the new window in the windowed mode along the axis in response to the drop of the UI object on the visible portion of the home screen.

13. A method for enabling drag and drop application launches within a user interface (UI), the method comprising:
receiving, in the computing device, a command by which a UI object currently displayed in a window of a first application is dragged from the window and automatically dropped onto a home screen of an operating system in response to the UI object being dragged from the window;
creating, by the first application, a data object that stores data related to the UI object in response to the command to drag the UI object, wherein the data object includes an object type of the UI object;
providing the data object from the first application to the operating system;
identifying, by the operating system, a second application that is suitable for displaying the object type of the UI object, wherein the second application is identified to enable editing and displaying the UI object by determining which application is assigned as a default application for a given UI object type; and
launching the second application in a new window in response to a drop of the UI object on the home screen, the new window displaying the UI object from the first application.

14. The method of claim 13, wherein:
the received command comprises a peeling gesture in which a corner of the UI object is selected and dragged in a direction toward a center of the UI object; and
the UI object is dislodged from the window of the first application and able to be dragged in response to the peeling gesture.

15. The method of claim 13, further comprising:
modifying the first application from a full screen mode to a windowed mode in response to the command to drag the UI object, wherein, in the windowed mode, a portion of the home screen is visible and each application is displayed in a reduced-size window along an axis; and
launching the second application in the new window in the windowed mode along the axis in response to the drop of the UI object on the visible portion of the home screen.

* * * * *